Patented Jan. 14, 1936

2,027,856

UNITED STATES PATENT OFFICE 2,027,856

PROCESS FOR PREPARING SUBSTITUTED ALDOLS

Kurt Billig, Frankfort-on-the-Main-Hochst, Germany, assignor to I. G. Farbenindustrie Aktiengesellschaft, Frankfort-on-the-Main, Germany No Drawing. Application May 25, 1934, Serial No. 727,587. In Germany June 2, 1933

10 Claims. (Cl. 260—140)

The present invention relates to a process of preparing substituted aldols.

R. Kuhn and M. Hoffer (see "Berichte der Deutschen Chemischen Gesellschaft", vol. 63, page 2164 and vol. 64, page 1977) have shown that acetaldehyde is transformed in the presence of piperidine into a mixture of various condensation products wherein large proportions of hexadienal and octatrienal are present.

I have now found that by the action of organic amines or the salts thereof with weak acids upon the homologues of the acetaldehyde, that is the saturated aliphatic aldehydes, from propionaldehyde upward, the condensation does not go beyond the aldols, not even if the action of the amine upon the aldehyde occurs very violently, for instance at a raised temperature. By means of this process the substituted aldols have become readily accessible in a high yield by a technically simple process.

I have found that the salts formed by weak acids, with organic amines which induce the condensation of the aldehyde have the same effect as the free amines and have, therefore, to be regarded as complete equivalents.

The following examples serve to illustrate the invention but they are not intended to limit it thereto, the parts being by weight:

(1) 2000 parts of butyraldehyde are mixed with 4 parts of diethylamine. In the course of some hours the temperature increases to 76° C. and then gradually decreases. After 24 hours traces of butyraldehyde can hardly be detected. Far more than 90 per cent. of the reaction product consists of butyraldol which may be purified by known methods.

If a proportion of diethylamine larger than that mentioned above is used, the reaction occurs so violently that cooling is necessary. The formation of aldol then ends in a very short time.

Instead of diethylamine there may be used also other amines as catalysts, for instance ethanol-methyl-amine, dimethylamine, piperadine, piperazine, ethylene-diamine.

(2) 2000 parts of commercial butyraldehyde, containing about 8 per cent. of butyric acid are mixed with 4 parts of diethylamine; the condensation is analogous to that described in Example 1.

(3) The temperature of a mixture of 100 parts of propionaldehyde and 1 part of diethylamine spontaneously rises gradually to 52° C. After some hours far more than 90 per cent. of propionaldol have been formed.

(4) 100 parts of butyraldehyde are mixed with 2 parts of diethylamine acetate; the temperature of the mixture gradually rises spontaneously to 49° C. After 1 to 2 days more than 90 per cent. has been transformed into butyraldol. The condensation of propionaldehyde occurs in a completely analogous manner; the temperature rises somewhat higher than 49° C.

Instead of diethylamine acetate there may for instance be used diethylamine propionate and diethylamine butyrate or other salts with weak acids.

I claim:

1. In the process of preparing substituted aldols by condensing a homologue of acetaldehyde the step which comprises admixing said homologue with an amine selected from the group consisting of the amines of the aliphatic series and those containing a saturated heterocyclic ring and condensing said homologue in the presence of said amine.

2. In the process of preparing substituted aldols by condensing a homologue of acetaldehyde the step which comprises admixing said homologue with an aliphatic amine and condensing said homologue in the presence of said aliphatic amine.

3. In the process of preparing substituted aldols by condensing a homologue of acetaldehyde the step which comprises admixing said homologue with a secondary aliphatic amine and condensing said homologue in the presence of said secondary aliphatic amine.

4. In the process of preparing substituted aldols by condensing a homologue of acetaldehyde the step which comprises admixing said homologue with diethylamine and condensing said homologue in the presence of said diethylamine.

5. In the process of preparing substituted aldols by condensing butyraldehyde the step which comprises admixing said butyraldehyde with an aliphatic amine and condensing said butyraldehyde in the presence of said aliphatic amine.

6. In the process of preparing substituted aldols by condensing butyraldehyde the step which comprises admixing said butyraldehyde with a secondary aliphatic amine and condensing said butyraldehyde in the presence of said secondary aliphatic amine.

7. In the process of preparing substituted aldols by condensing butyraldehyde the step which comprises admixing said butyraldehyde with diethylamine and condensing said butyraldehyde in the presence of said diethylamine.

8. In the process of preparing substituted aldols by condensing propionic aldehyde the step which comprises admixing said propionic aldehyde with an aliphatic amine and condensing said propionic aldehyde in the presence of said aliphatic amine.

9. In the process of preparing substituted aldols by condensing propionic aldehyde the step which comprises admixing said propionic aldehyde with a secondary aliphatic amine and condensing said propionic aldehyde in the presence of said secondary aliphatic amine.

10. In the process of preparing substituted aldols by condensing propionic aldehyde the step which comprises admixing said propionic aldehyde with diethylamine and condensing said propionic aldehyde in the presence of said diethylamine.

KURT BILLIG.